United States Patent [19]
Bricknell

[11] 3,972,569
[45] Aug. 3, 1976

[54] AUTOMATIC TRACK TENSIONING SYSTEM FOR TRACKED VEHICLE

[75] Inventor: William H. Bricknell, St. Thomas, Canada

[73] Assignee: Canadair Flextrac Ltd., Calgary, Canada

[22] Filed: Mar. 31, 1975

[21] Appl. No.: 563,328

[52] U.S. Cl. .................................. 305/10; 305/22
[51] Int. Cl.² ........................................ B62D 55/30
[58] Field of Search............ 180/9.2 R, 6.7; 305/10, 305/22; 213/43

[56] References Cited
UNITED STATES PATENTS

| | | | |
|---|---|---|---|
| 3,101,977 | 8/1963 | Hyler | 305/10 |
| 3,310,127 | 3/1967 | Siber | 305/10 |
| 3,647,270 | 3/1972 | Althaus | 305/10 |
| 3,733,107 | 5/1973 | Cote | 305/10 |
| 3,787,097 | 1/1974 | Orr | 305/10 |
| 3,826,543 | 7/1974 | Muller | 305/10 |

*Primary Examiner*—Kenneth H. Betts
*Assistant Examiner*—John A. Carroll
*Attorney, Agent, or Firm*—A. Lebrun

[57] ABSTRACT

A tracked vehicle which is provided with an automatic track tensioning assembly of the type adapted to control the pressure in the hydraulic cylinders tensioning the endless track. This track tensioning assembly distinctively includes a main control circuit and a pilot control circuit which are hydraulically isolated from each other with the main control circuit being operatively closed and isolated from the supply pump to more freely optimize the distinct functions of these circuits such as the response of the main control circuit. This track tensioning assembly includes a pilot valve for each hydraulic cylinder, an accumulator, and a relief valve in the main control circuit for release of pressure from the cylinders to the accumulaotr through the relief valve. The pilot valves are selectively operable by control valves in the pilot control circuit.

7 Claims, 2 Drawing Figures

AUTOMATIC TRACK TENSIONING SYSTEM FOR TRACKED VEHICLE

This invention relates to a tracked vehicle more particularly of the type including a track tensioning system adapted to automatically control the tension in the tracks in response to changes in the direction of the vehicle.

The U.S. Pat. Nos. 3,310,127 and 3,327,798 have proposed vehicles of the above type wherein the track tension is automatically related to forward, reverse, and to left and right steering. In these two patents, this control of tension in the tracks is done by a single hydraulic circuit with relief valves and control valves in that circuit and a pump always remaining connected to the circuit to replace the fluid which exits through the relief valves.

In the track tensioning systems of the above mentioned patents, the track tension is determined by hydraulic pressure which in turn is limited by one of the relief valves. The resistance offered by a track tensioning cylinder to increased track tension due to external forces depends on which relief valve has been brought into play by the corresponding control valve. If the hydraulic pressure becomes high enough to pop the relief valve, the cylinder retracts and oil is discharged through this relief valve back to the tank.

On removing this external force, the track tends to become slack, the pressure is reduced, and oil is pumped to the cylinder to compensate or replenish the oil which has discharged through either of the relief valves.

It is disadvantageous to have to replenish and the aforedescribed use of a pump is found disadvantageous since it relates the speed of response of the cylinders, upon slackening of the tracks, to the pump output. Besides, the same prior art systems use a single hydraulic circuit which passes through the control valves, the hydraulic cylinders, and the relief valves thereby imposing serious limitations to the relationship between the components. Furthermore, due to the essential function of the pump, any failure of the latter or of the drive thereof quickly results in a loose track what may immobilize the vehicle.

It is a general object of the present invention to provide a tracked vehicle of the above type with an automatic track tensioning system which is particularly adapted to relatively more reliably maintain nearly constant pressure in the track tensioning cylinders.

It is another general object of the present invention to provide a tracked vehicle of the above type with an automatic track tensioning assembly which allows quick response of the hydraulic cylinders or rams, which is of simple and reliable construction, and which allows substantial freedom in the relationship between the components.

It is a more specific object of the present invention to provide a tracked vehicle of the above type with an automatic track tensioning assembly which includes a main hydraulic control circuit operatively isolated from an hydraulic pilot control circuit and the supply pump and to thus allow separate optimization of the control functions thereof and such as by the use of two hydraulic circuits of distinct flows and pressures characteristics.

The above and other objects and advantages of the present invention will be better understood in the light of the following detailed description of preferred embodiments thereof which are illustrated, by way of example, in the accompanying drawing, wherein.

Figure 1:
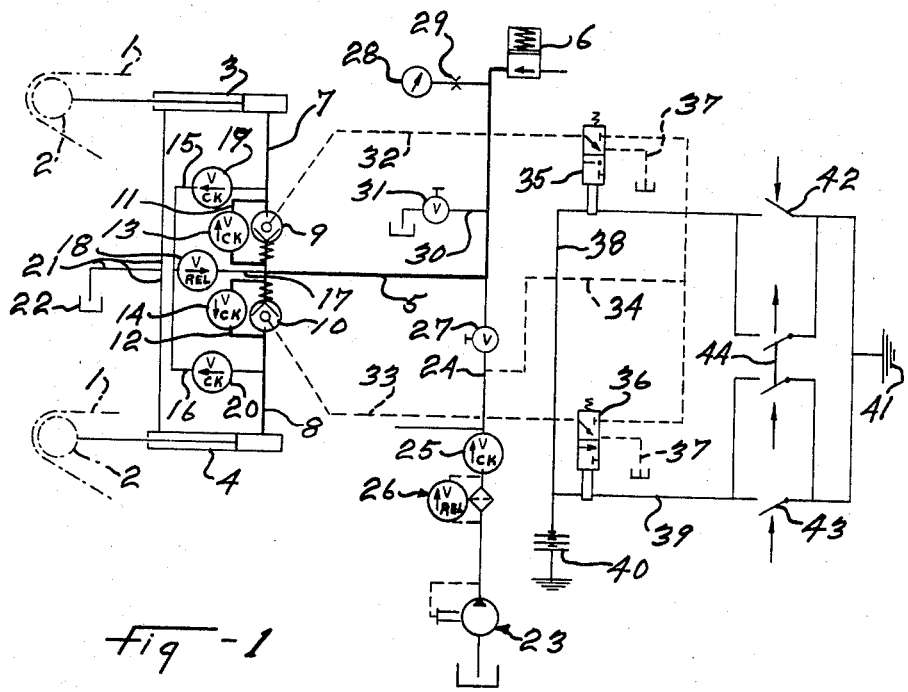
FIG. 1 is a diagram of a track tensioning system according to first embodiment of the invention.
Figure 2:
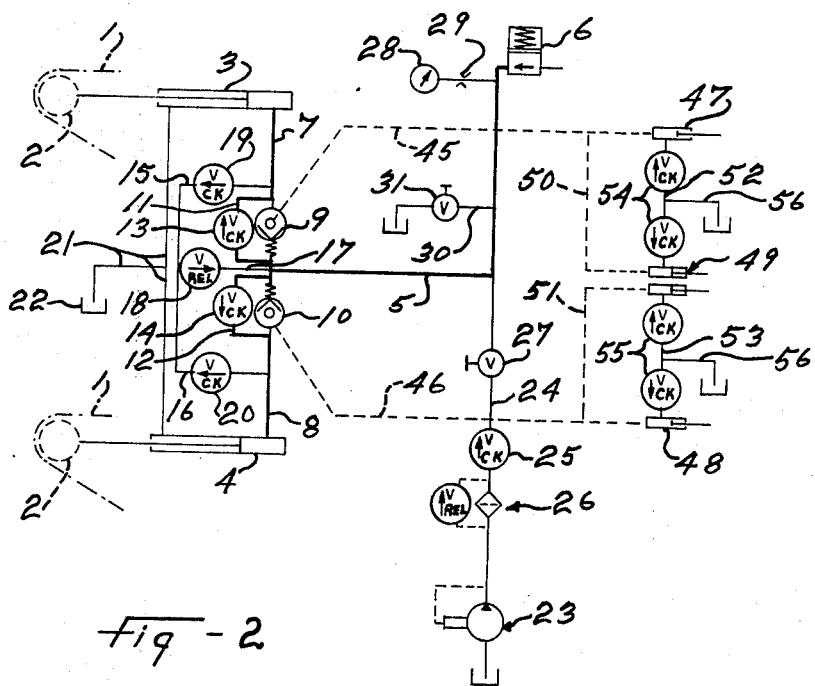
FIG. 2 is a diagram of a variant of the system of FIG. 1, according to a second embodiment of the invention.

The track tensioning system illustrated in FIG. 1 or 2 is associated to a tracked vehicle having a pair of endless tracks 1 looped and entrained around end wheels or sprockets 2 respectively, as is well known in the art. Hydraulic cylinders or rams 3 and 4 are connected to the right hand and left hand wheels 2 respectively in any appropriate manner, as known in the art, to axially displace the corresponding end wheel and thus either tighten or slack the corresponding endless track or belt.

A main hydraulic control circuit is provided to supply the hydraulic fluid or oil to the hydraulic cylinders 3 and 4. This main hydraulic control circuit includes an hydraulic line 5 connecting the cylinders 3 and 4 to an air-hydraulic accumulator 6 of any suitable construction. The cylinder-accumulator line 5 divides into a right hand branch 7 and a left hand branch 8 leading to the cylinders 9 and 10 are serially connected in the branch lines 7 and 8 respectively. The valves 9 and 10 are adapted to allow free flow therethrough when normal pressure of operation is desired. At that moment, the accumulator 6 serves to absorb or regulate the changes of tension which tend to be induced in the tracks by adverse ground conditions or obstacles.

Check valve lines 11 and 12 bypass the pilot valves 9 and 10 respectively and have check valves 13 and 14 therein respectively. The check valves 13 and 14 have their inlet end directed toward the accumulator 6. A pair of relief valve lines 15 and 16 bypass the pilot valves 9 and 10 respectively and define a common section 17. A relief valve 18 is connected in the common line section 17 and has its inlet pointed toward the hydraulic cylinders 3 and 4. A pair of isolating check valves 19 and 20 are connected in the relief valve lines 15 and 16 respectively with their inlet end pointing toward their corresponding hydraulic cylinder.

A lubricating line 21 places the pistons of the cylinders 3 and 4 in communication with a supply 22 of lubricating fluid.

A pump 23 is connected to the main hydraulic control circuit, more particularly to the cylinder-accumulator line 5 thereof, by an hydraulic line 24 having a check valve 25, a filter and by-pass valve 26, and a cock valve 27. This cock valve 27 serves to normally isolate the main hydraulic control circuit from the pump 23 and is opened only to replenish or fill this circuit.

A pressure gauge 28 is connected to the hydraulic line 5 through a flow restrictor 29 whereby to indicate the pressure in the main hydraulic control circuit. A drain line 30 and a drain cock 31 are connected to the line 5 to allow draining of the latter such as when it is desired to release the tension in the endless tracks 1.

An hydraulic pilot control circuit is provided to selectively or concurrently operate the pilot valves 9 and 10. In the first embodiment illustrated in FIG. 1, the hydraulic pilot control circuit includes a right hand hydraulic line 32 and a left hand hydraulic line 33 which are connected to the pilot valves 9 and 10 respectively, and which are fed hydraulic fluid through a common feed line 34 connected to the supply line 24 intermediate the check valve 25 and the isolating valve 27.

Solenoid operated control valves 35 and 36 are connected in the control lines 32 and 33 respectively and are adapted to selectively connect the lines 32 and 33 to a discharge line 37 or to the feed line 34. The solenoid control valves 35 and 36 are activated by an electrical control circuit including conductors or leads 38 and 39 respectively connected to the solenoids of the valves 35 and 36 and also both connected at one end to the battery 40 of the vehicle and at the other end to a ground 41. Switches 42 and 43 are connected to the conductors 38 and 39. The switches 42, 43, and 44 are connected in any suitable manner, not shown, to appropriate vehicle direction control mechanisms such as to be actuated in response to the changes of direction of the vehicle. More particularly, the switches 42 and 43 are connected to the steering mechanism such that steering to the right closes switch 42 while steering to the left closes switch 43. The switch 44 is connected to the gear shift mechanism to be actuated in response to gear shifting between forward and reverse.

The hydraulic pilot control circuit, according to the second embodiment of the invention shown in FIG. 2, includes a pair of hydraulic lines 45 and 46 connected to the pilot valves 9 and 10 to actuate the latter. The hydraulic control lines 45 and 46 are selectively activated by a pair of hydraulic cylinders 47 and 48 respectively or are simultaneously activated by a dual hydraulic cylinder 49 connected to the lines 45 and 46 by the lines 50 and 51 respectively. Hydraulic lines 52 and 53 connect the cylinders 47, 48 and 49 to a reservoir through isolating check valves 54 and 55 and conduits 56.

The track tensioning system according to either embodiment of the present invention is originally set ready for operation by opening the valve 27 such as to allow the fluid supply pump 23 to fill the aforedescribed main control circuit and the cylinders 3 and 4 with hydraulic fluid at a predetermined normal pressure. Thereafter, the valve 27 is closed to isolate the main hydraulic control circuit which then forms a closed hydraulic circuit. For normal operation, both pilot valves 9 and 10 are sprung open thereby free flow to and fro between the cylinders 3 and 4 and the accumulator 6. In this condition, the obstacles and bumps encountered by the endless tracks 1 will produce hydraulic fluid or oil to be discharged from the corresponding cylinder or cylinders toward the air-hydraulic accumulator 6 followed by return of the oil to the cylinders after the tension in the track has been released.

In order to allow either cylinder 3 or 4 to take a higher track tension, the corresponding pilot valve 9 or 10 is closed. This allows higher pressures in the cylinder until the relief pressure of the valve 18 is reached. When the pressure setting of the valve 18 is exceeded, the oil is discharged from the corresponding cylinder toward the accumulator through this relief valve. Slackening of one endless track will instead cause a reduced pressure in the corresponding cylinder and opening of the corresponding check valve 13 or 14.

The pilot valves 9 and 10 may be either selectiverly or concurrently closed. The closing of only one pilot valve is done to steer the vehicle to the same side while concurrent closing is done for reverse or downhill drive.

In the embodiment of FIG. 1, right hand steering causes the switch 42 to close thereby energizing the solenoid of the control valve 35 what causes activation of the control line 32. This closes the pilot valve 9 for the right hand cylinder and allows higher pressures in the latter, as aforedescribed. Consequently, the right hand track in this example is allowed to operate at higher tension than the left hand track. When instead, the vehicle is commanded to reverse drive, the dual switch 44 is closed thereby resulting in energization of both control valves 35 and 36 and concurrent closing of both pilot valves 9 and 10.

In the embodiment of FIG. 2, there is shown a fully hydraulic mode of actuation of the pilot valves wherein the latter are actuated by hydraulic cylinders 47, 48, or 49.

What I claim is:

1. A tracked vehicle comprising a pair of endless tracks, end wheels around which said endless tracks are looped and entrained respectively, a pair of track tension adjustment means connected to said end wheels respectively and constructed and arranged to vary the tension in the corresponding endless track, a main hydraulic control circuit operatively connected to said pair of track tension adjustment means, a pair of pilot valves inserted in the main hydraulic control circuit, a hydraulic fluid accumulator communicating with the main hydraulic control circuit, a pilot control circuit connected to the pilot valves, a pair of selectively controllable devices connected by the pilot control circuit to the pilot valves respectively, and a vehicle direction control mechanism connected to the selectively controllable devices and selectively actuating the latter in response to desired changes in the direction control of the vehicle.

2. A tracked vehicle as defined in claim 1, wherein each of said track tension adjustment means includes a hydraulic cylinder, and a relief valve bypasses each of said pilot valves, is connected in series with the hydraulic cylinders and with the hydraulic fluid accumulator, and has an inlet directed toward the hydraulic fluid accumulator for pressure relief from the hydraulic cylinders to the hydraulic fluid accumulator.

3. A tracked vehicle as defined in claim 2, wherein said main hydraulic control circuit includes a cylinder-accumulator line having one of the pilot valves serially connected therein, one check valve line and one relief valve line each inter-connecting the opposite ends of said one pilot valve and by-passing the latter, and a check valve and said relief valve are serially connected in said check valve line and relief valve line respectively and oppositely connected relative to each other whereby to allow high pressure relief in said accumulator.

4. A tracked vehicle as defined in claim 3, wherein said cylinder-accumulator line includes a pair of branch lines connecting said cylinders respectively to said hydraulic accumulator, said one pilot valve and the other of said pilot valves are serially connected in said branch lines respectively, another check valve line and another relief valve line interconnect the opposite ends of said other pilot valve and bypass the latter, another check valve is serially connected in said another check valve line, and said another relief valve line merges with said one relief valve line at the inlet end of said relief valve.

5. A tracked vehicle as defined in claim 4, further including an isolating check valve serially connected in each of said relief valve lines and having the input directed toward the corresponding cylinder thereby operatively isolating said hydraulic cylinders one from the other.

6. A tracked vehicle as defined in claim 5, further including an hydraulic fluid supply pump connected to said cylinder-accumulator line, a valve selectively isolating said pump from said cylinder-accumulator line, and a drain cock connected to the latter and adapted to drain the same and said cylinders to release the endless tracks.

7. A tracked vehicle as defined in claim 6, wherein said hydraulic pilot control circuit includes a pair of hydraulic control lines connected to said pilot valves respectively, said selectively controllable devices include a pair of single control cylinders connected to said hydraulic control lines respectively, and a dual control cylinder connected to both hydraulic control lines, said vehicle direction control mechanism includes a steering mechanism and a gear shifting mechanism, the steering mechanism is operatively connected to said single control cylinders and adapted to selectively actuate the latter in response to steering command, and the gear shifting mechanism is operatively connected to said dual control cylinder and adapted to actuate the latter and thereby activate both said hydraulic control lines in response to shifting between forward and reverse drive.

* * * * *